Patented Mar. 14, 1944

2,344,081

UNITED STATES PATENT OFFICE 2,344,081

PROCESS FOR CAUSING LUMINESCENT SUBSTANCES TO ADHERE TO GLASS WALLS

André Claude, Paris, France; vested in the Alien Property Custodian

No Drawing. Application March 29, 1940, Serial No. 326,801. In Switzerland March 29, 1939

7 Claims. (Cl. 117—34)

As it is known, there are two general methods for causing luminescent matters to adhere to glass walls:

The first method consists in first depositing a layer of a binder on the wall, then the luminescent matter on the layer of binder. The binder is subsequently eliminated by heat, so that finally the grains of luminescent matter adhere directly to the glass surface. In particular it has been proposed to employ as binder a solution of boric acid in glycerine. Subjected to purely mechanical action, such as the rubbing of a finger, the luminescent matter thus deposited adheres strongly to the glass surface. On the contrary, subjected to other actions, it adheres but little thereto. For instance, a drop of mercury running on the wall covered with the luminescent matter can detach said matter from the wall. This constitutes a drawback when the surface on which the luminescent matter is deposited is the inner surface of a tube intended to act as electric discharge tube containing mercury.

The second method consists in placing the luminescent matter in suspension in a liquid, in applying the suspension to the glass wall and then eliminating the liquid by heating. For instance, it has already been proposed to make use, as liquid, of nitro-cellulose. In this case, a drop of mercury running on the wall covered with luminescent matter no longer has the effect of detaching said matter. On the contrary, under the effect of a mechanical action, for instance the rubbing of a finger, the luminescent matter detaches more easily than in the case of the first method above mentioned.

The method according to the present invention combines the advantages of the two methods which have just been mentioned, without involving their drawbacks. The method according to the invention is based on the same principle as the second mentioned known method, in which the luminescent matter is deposited on the glass wall in the form of a suspension in a liquid.

According to the present invention, this liquid consists of a mixible mixture, formed on the one hand of a cellulosic ester dissolved in a volatile solvent, and on the other hand of one of the boric, phosphoric, arsenic or antimonic acids, dissolved in the preceding solution, for instance owing to a second volatile solvent.

The above mentioned acids, which have this character in common that they are acid oxygenated compounds of trivalent metalloids, solid at ordinary temperature, can eventually be used simultaneously.

Preferably, the cellulosic ester that is chosen is cellulose acetate and the solvent for the ester is acetone. To the solution of the ester in a volatile solvent there is preferably added a plastifying agent, for instance dibutyl phthalate or benzyl alcohol.

If the acid is soluble in a volatile solvent of the cellulosic ester, the same solvent may be used as solvent for the acid. For instance, if the solution of the cellulosic ester in the volatile solvent consists of a solution of cellulose nitrate in acetone and if the acid consists of phosphoric acid, which is soluble in acetone, acetone can be utilized as common solvent for both the ester and the acid. If, on the contrary, the acid is boric acid, which is little soluble in acetone, it is necessary, before adding it, to dissolve it in a volatile solvent of boric acid, for instance methyl alcohol.

It has been found that the most favorable results, from the point of view of the regularity of the deposit and of the adherence, are obtained by making use of a luminescent matter prepared in extremely fine grains, of the order of magnitude of the micron or less.

Example of a suspension made according to the present invention:

| | Gr. |
|---|---|
| Luminescent zinc silicate | 60 |
| Acetone | 100 |
| Nitro-cellulose | 2.5 |
| Anhydrous boric acid | 0.18 |
| Methyl alcohol | 3.6 |
| Butyl phthalate | Some drops |

It will be noted that, in this example, the percentage of boric acid is relatively very low. Experience shows that a very low percentage is extremely efficient for obtaining a strong adhesion. Too large an amount of acid may be disadvantageous for the facility of elimination, subsequently, by means of heat, of the organic compounds present in the liquid.

After having applied onto the glass wall the suspension of the luminescent matter in the liquid mixture, the volatile solvent or solvents is, or are, eliminated through known means, for instance by means of a gaseous stream, such as an air stream, or by heating, or by both simultaneously. Then the whole is heated for decomposing the cellulosic ester and eventually the plastifying body into volatile components which disappear. If the decomposition of the ester produced a carbon deposit, as it is the case with cellulose acetate, the heating is continued for the necessary amount of time in the presence of air, in such manner as to eliminate carbon by combustion.

Heating may be effected to a temperature sufficient for obtaining the melting of the acid that is utilized. In this case, with boric acid, for instance, an extremely secure fixation of the luminescent matters on the glass wall is obtained.

The method may be well adapted for applying a simple luminescent matter or mixtures of matters, and also for the successive application of several layers of matter.

What I claim is:

1. The method of coating the surface of a glass wall with finely divided fluorescent material which comprises forming a suspension containing the fluorescent material, a volatilizable binder comprising a cellulosic ester dissolved in a volatile solvent, and an acid selected from the group consisting of boric, phosphoric, arsenic and antimonic acids, applying a coating of the suspension to the surface of the glass wall, and then firing the glass wall to burn out and volatilize the binder.

2. A method of coating glass surfaces with fluorescent material as set forth in claim 1 wherein the binder consists of cellulose acetate dissolved in acetone.

3. A method of coating glass surfaces with fluorescent material as set forth in claim 1 wherein the binder further includes a volatilizable plastifying agent which is also volatilized by the firing of the glass wall.

4. A method of coating glass surfaces with fluorescent material as set forth in claim 1 wherein the binder further includes a small amount of dibutyl puthalate which is also volatilized by the firing of the glass wall.

5. A method of coating glass surfaces with fluorescent material as set forth in claim 1 wherein the firing is continued until the acid is fused.

6. The method of coating the surface of the glass envelope of an electric discharge device with a finely divided fluorescent material which comprises mixing a very small percentage of boric acid with the fluorescent material and suspending the mixture in a volatilizable binder comprising a cellulosic ester dissolved in a volatile solvent, applying a coating of the suspension to the surface of the envelope and then firing the envelope to burn out and volatilize the binder.

7. The method of coating the surface of the glass envelope of an electric discharge device with a finely divided fluorescent silicate which comprises mixing a very small percentage of boric acid with the fluorescent silicate and suspending the mixture in a volatilizable binder comprising a cellulosic ester dissolved in a volatile solvent, applying a coating of the suspension to the surface of the envelope to burn out and volatilize the binder.

ANDRÉ CLAUDE.